March 8, 1938.   E. B. GRAVES   2,110,764
X-RAY APPARATUS
Filed June 18, 1935   4 Sheets—Sheet 1

INVENTOR.
EDWARD B. GRAVES
BY Chester Tietig
ATTORNEY.

March 8, 1938.   E. B. GRAVES   2,110,764
X-RAY APPARATUS
Filed June 18, 1935   4 Sheets-Sheet 2
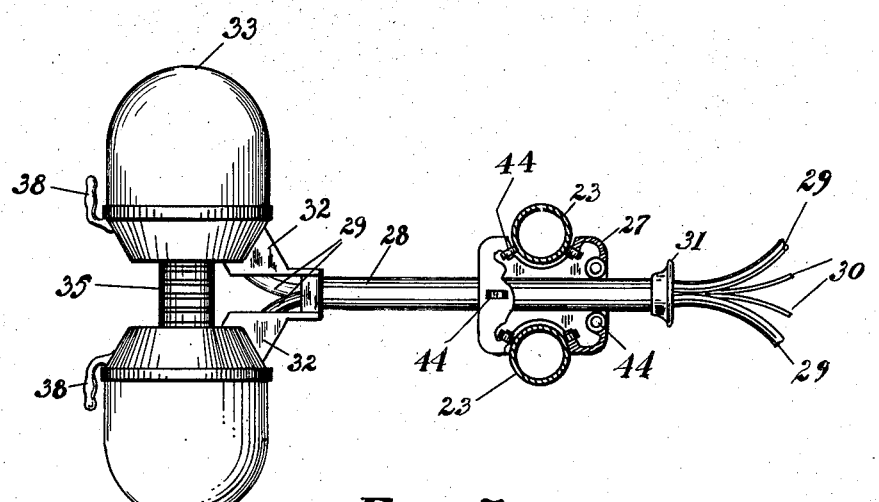
Fig. 5.
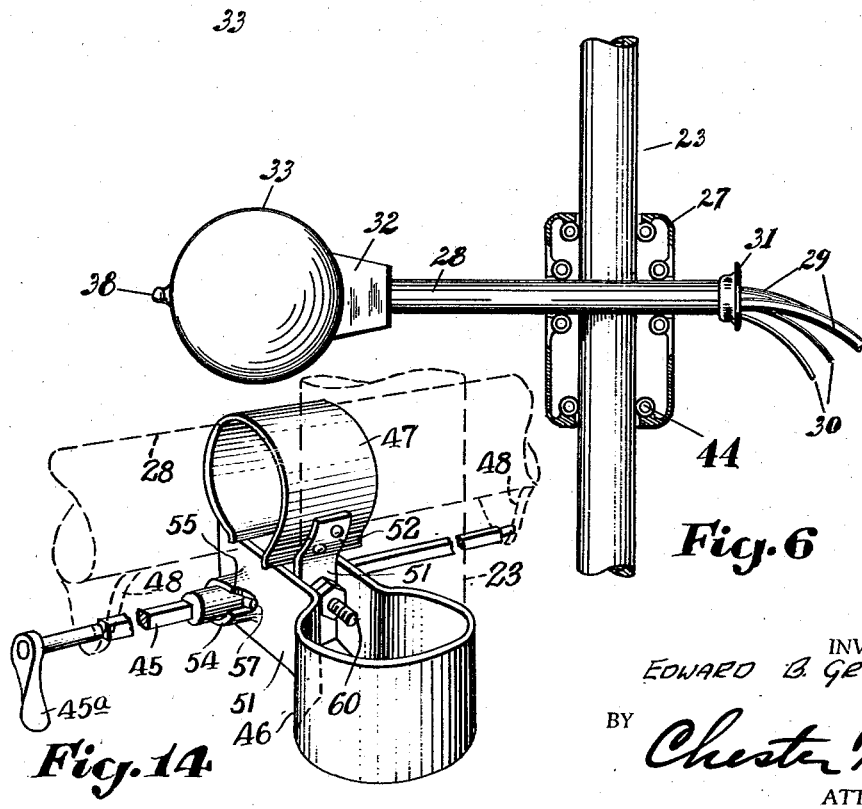
Fig. 6
Fig. 14
INVENTOR.
EDWARD B. GRAVES
BY Chester Tietz
ATTORNEY.

March 8, 1938. E. B. GRAVES 2,110,764
X-RAY APPARATUS
Filed June 18, 1935 4 Sheets-Sheet 3

INVENTOR.
EDWARD B. GRAVES
BY Chester Tietig
ATTORNEY.

March 8, 1938.  E. B. GRAVES  2,110,764
X-RAY APPARATUS
Filed June 18, 1935  4 Sheets-Sheet 4
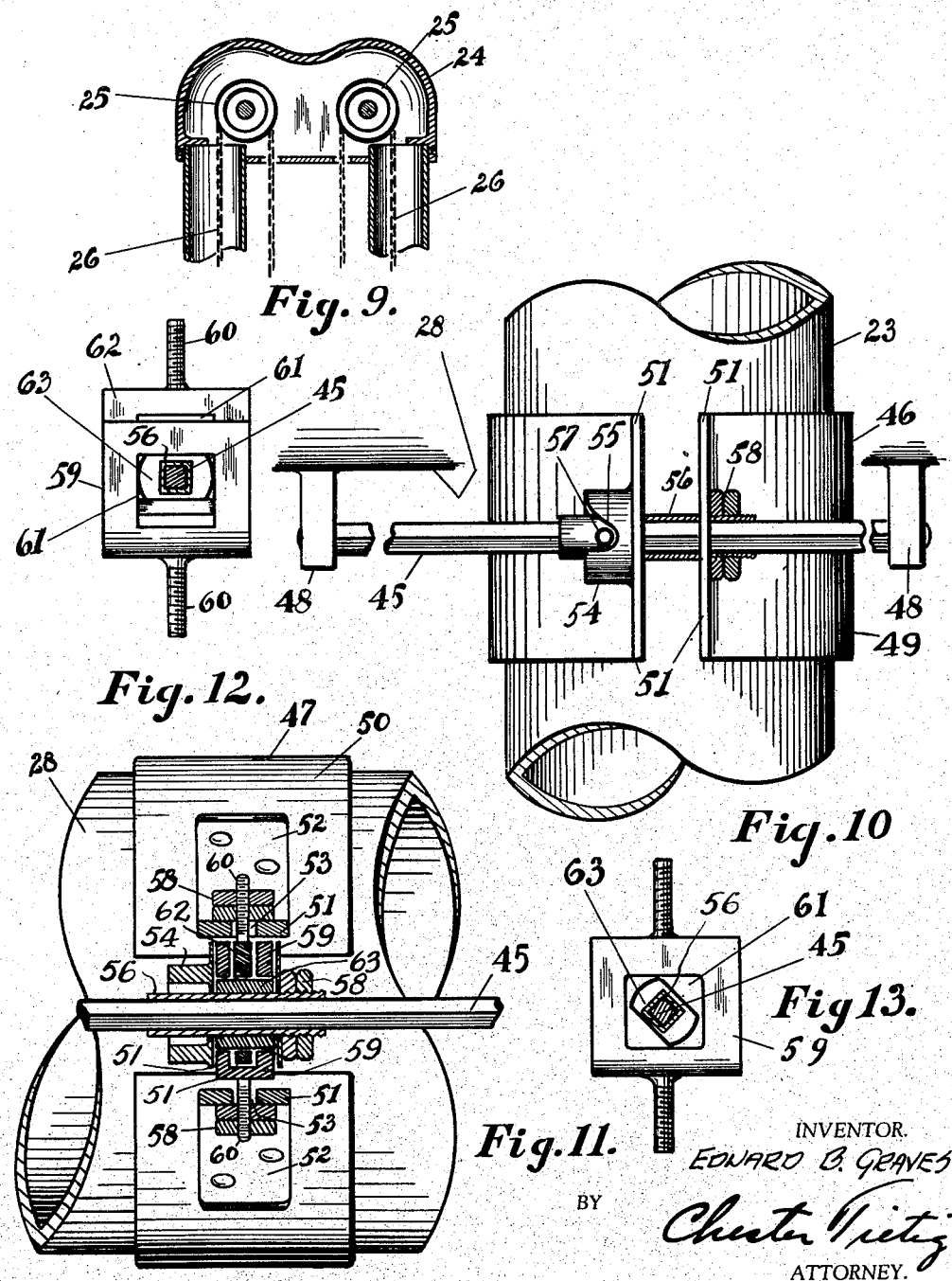

Patented Mar. 8, 1938

2,110,764

UNITED STATES PATENT OFFICE 2,110,764

X-RAY APPARATUS

Edward B. Graves, Fort Mitchell, Ky., assignor to The Kelley-Koett Manufacturing Company, Inc., Covington, Ky.

Application June 18, 1935, Serial No. 27,217

8 Claims. (Cl. 250—34)

This invention relates to an X-ray apparatus, specifically a therapy tube stand. The invention is not, however, limited to therapy apparatus since it may also be applied to radiographic apparatus.

Among the objects of the invention are to provide a tube stand and electrical connections therefor, which combination is shockproof, adaptable to all positions required for therapy and radiography and extraordinarily safe from either undesired emergence of the X-ray beam or of electricity used in producing the beam. Other objects are ease of manipulation and stability in all positions when locked.

Referring to the accompanying drawings, Fig. 1 is a front elevation of my apparatus.

Fig. 5 is a plan view of a cross section of the apparatus taken on the line 5—5 of Fig. 2.

Fig. 6 is an elevation taken on the line 6—6 of Fig. 1.

Fig. 9 is a vertical section on the top of the stand on the line 9—9 of Fig. 4 showing the counterweight pulleys and chains.

Fig. 10 is an elevational detail of one of the clamps provided to lock the head on one of the vertical columns.

Figure 1:
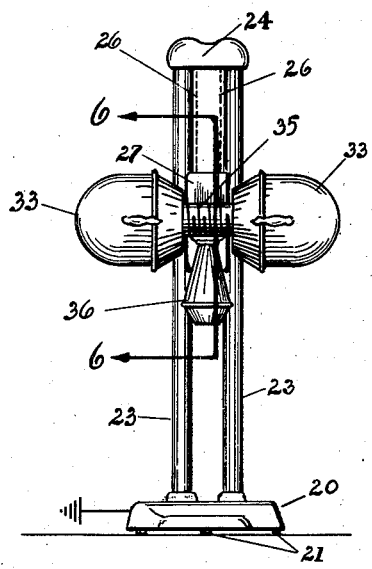

Fig. 11 corresponds to Fig. 10 and shows sectional details of the clamp mechanism which grasps the horizontal arm.

Fig. 12 is a detail of the most important clamp parts showing them in open position.

Fig. 13 corresponds to Fig. 12 except that the parts are shown in locked position.

Fig. 14 is a phantom perspective detail view showing the arrangement of the clamps.

In the first four figures, 20 is a generally triangular base provided with a set of casters 21 (partly shown). The apex of the base is to the front and bears a raised portion 22, the thickness of which increases constantly as the apex is approached. The result is that the base weighs approximately as much at its apex as at the rear, therefore stability is promoted.

From the rear of the base, equidistant from the middle thereof, two columns 23 arise. They are round and hollow to receive counterweights (not shown). At their tops they are joined by a cap in which, as may be seen in Fig. 9 are mounted two pulleys 25. Chains 26 are filled into the pulley grooves; one end of each chain is attached to a counterweight (not shown) inside the column while the other end is attached to a saddle 27 which is arranged to slide vertically on the columns. The range of vertical travel is substantially from the base 20 to the cap 24.

Figure 2:
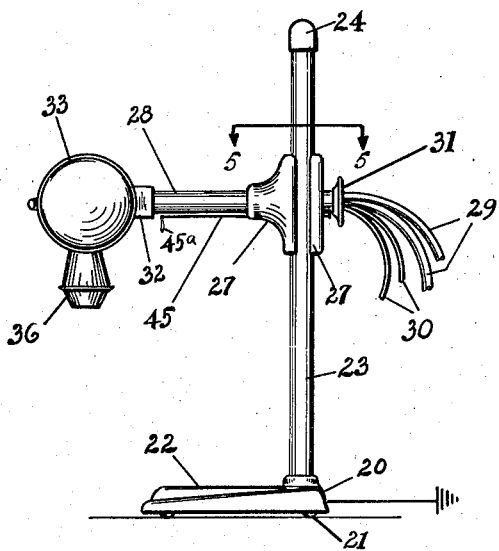
Fig. 2 is a side elevation showing the cable connections and therapy head extended.
Figure 3:
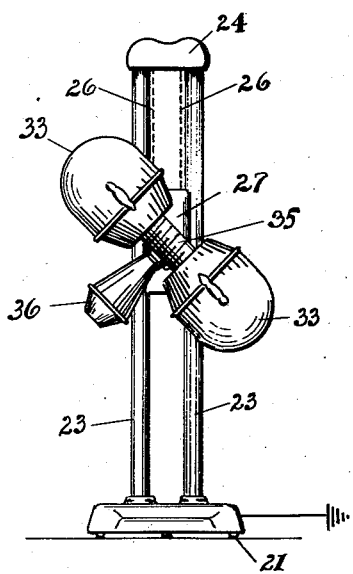
Fig. 3 is a front elevation showing the therapy head tilted to the left.

Extending horizontally thru the sliding saddle 27 there is a round hollow cross arm 28 which is horizontally slidable in the saddle 27. It is shown fully extended forward in Fig. 2 and fully retracted in Fig. 4. Electric cables 29 and circulating oil conduits 30 enter the rear of the arm 28 thru a flared collar 31 which is a device for preventing cutting into the cables by the otherwise sharp edge of the arm.

Figure 4:
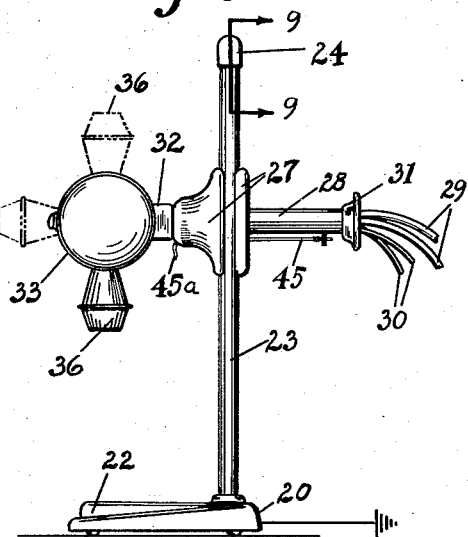
Fig. 4 is a side elevation showing the therapy head retracted. The dotted lines indicate positions which the head may be made to assume.
Figure 7:
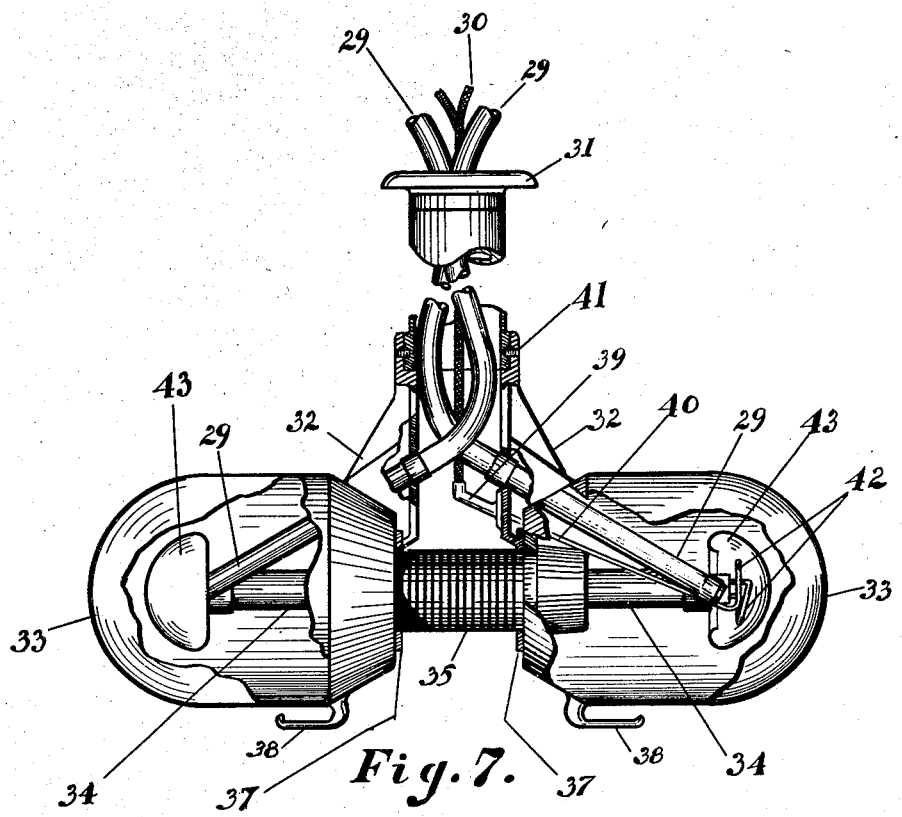
Fig. 7 is a plan view of the therapy head and arm, showing the X-ray tube and its cable connections.
Figure 8:
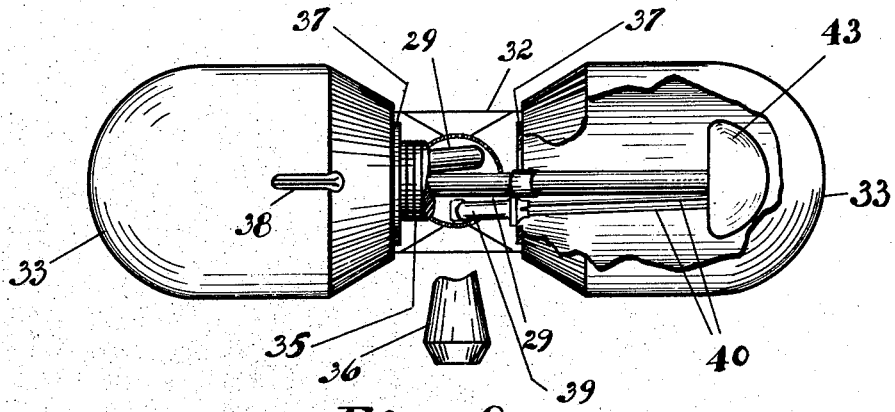
Fig. 8 is a front view of the therapy head and cone broken away to show the cable and oil tube connections. The X-ray tube is not shown in this view.

On the forward end of arm 28 there is a box-like housing 32 which also contains the cables and oil tubes. Attached to the front end of this housing on each side thereof, are the two ray-proof and shockproof metal shields 33 each of which protects one end of the X-ray tube 34 (Fig. 7). Between the shields 33 is a connecting tube 35 which is a part of and protects the X-ray tube and is provided in the usual manner with a window (not shown) for the emergence of the X-ray beam and appropriate ray filters thereover (not shown). A detachable cone 36 and means for attaching it (not shown) are provided to limit the area being rayed and this is shown in Fig. 4 in dotted lines in the various positions it may assume.

For the purpose of providing such means of directing the X-ray beam to various quarters, the tube 35 is made rotatable in plain bearings 37 carried in the inner or conical ends of the housings 33. To provide a nearly universal adjustment for the beam, a rotatable joint 41 joins the shockproof head structure and the forward end of arm 28 to permit easy rotation of the former. Since this rotation naturally has a tendency to twist the cables, sufficient slack is left in them in that part of their length that is packed in the arm 28. For this purpose, the cables 29 are crossed inside of arm 28. For ease in rotating the arm, the heads 33 are each provided with a handle 38 on the furthest forward line.

In order to make the oil tubes 30 rigid within the right hand shield 33 they are run thru a guide 39 made of synthetic resin material and securely attached to the inner wall of the housing 32. From this guide, two rigid synthetic resin tubes 40 extend to the anode of the X-ray tube so that they can respectively convey cooling oil of high dielectric strength to and from the hollow anode of the X-ray tube. Power for this purpose is supplied by an oil pump (not shown) which is not an integral part of this apparatus.

Flexible, spirally wound copper leads 42 join the ends of cables 29 with the appropriate terminals of the X-ray tube and so provide sufficient slack to allow the X-ray tube to be rotated without straining the electrical connections. The leads 42 as well as each cable end are housed in a flash-over shield 43 one of which is attached to each end of the X-ray tube 34. Electrical stress is uniformly distributed over these shields which are inside shock-proof shields 33, and these in turn are grounded in any appropriate manner. The preferred way is to solder a ground wire to the base 20 which grounds the entire apparatus and makes it shockproof in all cases.

The saddle 27 has the general form of a box having a pinched mid-section to accommodate the two columns 23. Within the box there is a plurality of ball bearing rollers 44 some of which are arranged to bear against the columns 23 and others against the arm 28. Easy traverse of movable members is thereby assured, as well as great rigidity when locked.

A locking bar 45, shown in Figs. 2, 4, 10, 11 and 14, of substantially rectangular cross-section intermediate its ends is rotatably supported in two lugs 48 attached to the lower side of arm 28 adjacent its ends and this bar extends parallel to the arm and intersects the saddle 27. The arm 28, and consequently the locking bar 45, moves with the saddle when the latter is raised and lowered upon the columns 23, as has previously been described, and when the arm is shifted in a horizontal plane transversely of the saddle the locking bar moves with the bar by virtue of the clearance openings provided through the walls of the hollow saddle where this bar traverses the latter. The locking bar is provided at one end with an angled handle 45a which upon being rotated in one direction simultaneously actuates a clamp 46 to lock the saddle against vertical displacement and a clamp 47 to lock the arm 28 against horizontal movement; and when the handle 45a is turned in the opposite direction these clamps are released to permit adjustment of the saddle upwardly or downwardly and also to allow shifting of the arm 28 (carrying the shockproof head assembly) forwardly or backwardly. The clamps 46 and 47 are preferably housed within the saddle 27 and, as indicated in Fig. 14, are assembled in compact relation. These clamps comprise split bands 49 and 50, respectively, preferably of spring metal lined with soft friction material, such as brake lining, and the ends of both clamps are provided with upturned ears 51, which in clamp 47 are attached to band 50 by riveted straps 52. The clamps are arranged at right angles to each other as best shown in Fig. 14; and also, as shown in this figure and in Fig. 11, the pair of ears of clamp 46 is spaced apart a distance exceeding the width of the straps 52 which allows the ears 51 of the latter to be disposed therebetween. Thru the pairs of ears of both bands there are provided holes, designated 53 in Fig. 11. The clamps 46 and 47 differ in their operating mechanism. On clamp 46 a sleeve 54, having a cam shaped edge 55 is mounted on the flat surface of one upturned ear 51 in the middle thereof. A sleeve 56, the outer surface of which is cylindrical and the inner rectangular is mounted on the rectangular rod 45 at that part of its length which goes thru the two ears 51 and some distance beyond this part. A lug 57 is fixed transversely on sleeve 56 so as to be in engagement with cam surface 55.

A pair of nuts 58 are provided on the opposite end of sleeve 56 which is therefore threaded at one end so that the amount of space between ears 51 can be controlled. To operate clamp 46 one therefore rotates bar 45 by its handle so as to cause lug 57 to leave the depression in cam edge 55 and to ride up and be retained on the straight part of this edge. This causes sleeve 54 to be pushed toward the opposite ear 51 thereby decreasing the distance between them and so locking the clamp on column 23.

In clamp 47 a different device is used to pull the ears 51 together. This device is shown separate in Fig. 12 in a plan view in open position, i. e., so as to leave the ears 51 apart, and in Fig. 13 in closed or locked position. The device consists of a U shaped fork 59 between the tines of which is slidably received a flat member 62 substantially identical with one of the tines of the first mentioned fork 59 except that it is straight. Both members are provided with threaded cylindrical ends 60 and both have square openings 61 in their flat surfaces. The threaded ends are arranged to project thru the holes 53 and are retained by nuts 58. Thru the square openings 61 the bar 45 projects transversely. A sleeve 63 of rectangular cross section, somewhat bulged on the shorter sides, fits over rod 45 where it passes thru the openings 61. The short sides are of such length that when the sleeve 63 is in a position as shown in Fig. 12 wherein the flat member 62 is partially pulled out of the U shaped portion of the fork 59, the tension on the clamp 47 is released. When the bar 45 and its sleeve 63 are rotated as shown in Fig. 11, the flat member 62 is pulled by the cam action of the sleeve into the space between the tines of the fork 59 and there retained, thereby locking the clamp 47. Since both clamps 46 and 47 are locked by the same motion of the same bar 45, their action is necessarily simultaneous.

In operation, my apparatus is adjusted to height by grasping the handles 38 and raising the entire head and arm assembly to the desired height, then pulling or pushing the said handles until the desired horizontal adjustment is obtained. Following this, the head is rotated by these handles to the desired left or right angular position, following which the cone is rotated until the forward or rear angular position is adjusted. The handle 45a is then rotated sufficiently to lock the clamps. In order to avoid possible confusion, the clamps 46 and 47 are omitted from Figs. 5 and 6. As will be apparent from Figs. 11 and 14, however, the clamp 47 will be restrained by the ears 51 of clamp 46 from moving with the arm 28 when the latter is adjusted horizontally.

It is to be understood that filament heating leads are connected to the cathode in my apparatus as well as one high tension lead, but since they are conventional, they have not been shown.

Another matter which is probably obvious to experts but which may require explanation to others is that the amount of friction which is required to rotate the shockproof head to left or right about arm 28 and that required to rotate the X-ray tube in the shockproof head is great enough to preclude those members from dropping down by force of gravity or any ordinary vibration after they have been set to any given position.

I claim as my invention:—

1. In combination in an X-ray apparatus, a base, two side by side hollow columns arising from said base, a cap at the top of the columns joining the latter, a saddle mounted to move vertically on both columns, and between them a cross arm mounted in said saddle so as to be movable therein horizontally and therewith between said columns, means including a single control lever for locking said saddle and said cross arm simultaneously by actuation of said lever, a plurality of pulleys in said cap, chains mounted over said pulleys, counterweights in each of said columns, said chains joining said saddle and said counterweights, said cross arm carrying an X-ray tube operatively attached to the forward end of said cross arm and electrical cables within said arm to supply current to said X-ray tube, means in contact with said cross arm to allow rotation of said X-ray tube to left and right, a pair of shields, one on each end of said X-ray tube, and said shields enclosing their respective ends of said X-ray tube, a bearing on each inner end of said shields, said X-ray tube being fitted into said bearings so as to permit rotation of said tube about its horizontal axis.

2. In combination in an adjustable support, a substantially triangular base, a pair of parallel vertical hollow columns arising from said base near the base line of the triangle defined by the base and substantially equi-distant from said line, a thickened weighted portion of the base at the apex of the triangle, a cap joining the columns at the top thereof, a pair of pulleys in said cap, chains mounted over said pulleys, counterweights in each of said columns, a vertically movable saddle between said columns, a horizontally movable hollow rotatable cross arm mounted therein between said columns and extending thru said saddle over the apex of said base and a clamp on said saddle and cross arm adapted to lock the cross arm to said saddle against horizontal and the saddle against vertical movement to a column by the operation of a single lever.

3. In an X-ray apparatus, a base, two side by side columns arising from said base, a vertically movable saddle between said columns, a cross arm supported by said saddle and horizontally slidable therein, means for mounting an X-ray tube by its middle section upon the outer end of said cross arm, means for supporting said X-ray tube by its ends at the outer end of said cross arm, both of said means being also adapted to permit rotation of said X-ray tube upon its own horizontal axis, and means adapted to lock the position of said saddle, cross arm and X-ray tube as a whole against vertical movement and as to horizontal movement.

4. In an X-ray apparatus the combination which comprises a base, parallel columns arising from said base, a vertically movable saddle between them, a cross arm supported by and movable in said saddle, said cross arm being adapted to support an X-ray tube at its outer extremity, means for locking said cross arm and saddle to at least one column against vertical travel and for locking said cross arm positively against horizontal travel, said means being actuable by a single lever.

5. In an X-ray apparatus a base, columns arising from said base, a vertically movable saddle mounted between said columns, a horizontally movable cross arm supported by and slidable in said saddle and rotatable therein, an X-ray tube supported on the outer end of said cross arm and means for simultaneously locking said cross arm positively to said saddle against horizontal travel and said saddle positively to at least one of said columns against vertical travel.

6. In combination in an X-ray apparatus, a base, two side by side hollow columns arising from said base, a cap at the top of the columns, joining the latter, a saddle operative to move vertically on both columns and between them, a cross arm mounted in said saddle so as to be slidable therein by an operator and vertically movable with the saddle at the will of the operator, a plurality of pulleys in said cap, chains mounted over said pulleys, counterweights in each of said columns, said chains joining said saddle and said counterweights, an X-ray tube operatively attached to the forward end of said cross arm, the latter being hollow and carrying electrical tables within it, operatively connected to supply current to said X-ray tube, a rotatable joint on said cross arm near said X-ray tube to allow rotation of said X-ray tube about an axis which is a forward continuation of the longitudinal axis of said cross arm, a pair of shields, one on each end of said X-ray tube, each shield enclosing its respective end of said X-ray tube, a bearing connecting each inner end of said shields, said X-ray tube being fitted into said bearings so as to permit rotation of said tube about its horizontal axis, and a locking means including a single control lever for locking said saddle and said cross arm simultaneously to at least one column by actuation of said lever, whereby to fix the location of said X-ray tube.

7. In combination in an X-ray apparatus, a base, two parallel hollow columns arising from said base, a cap at the top of the columns, joining them, a saddle operative to move vertically on both columns; between them a rotatable hollow cross arm mounted in said saddle so as to be movable therein horizontally and vertically between said columns, said arm carrying an X-ray tube at its outer end, means for locking said saddle and said cross arm from a single point, a plurality of pulleys in said cap, chains mounted over said pulleys, counterweights in each of said columns, said chains joining said saddle and said counterweights, electrical cables in said cross arm for supplying said X-ray tube with current and means carried on the end of said cross arm to receive an X-ray tube and to allow rotation of said X-ray tube to left and right.

8. In combination in an X-ray apparatus, a base, two parallel hollow columns arising from said base, a cap at the top of the columns joining the latter, a saddle operative to move vertically on both columns and between them, a cross arm mounted in said saddle and horizontally slidable between said columns, means for locking said saddle and said cross arm simultaneously, a plurality of pulleys in said cap, chains mounted over said pulleys, counterweights in each of said columns, said chains joining said saddle and said counterweights, said cross arm carrying an X-ray tube operatively attached to its forward end, means attached to said cross arm to allow moderately easy rotation of said tube to left and right and an electrical connection to the ground from the entire assembly of parts not in electrical connection with the X-ray tube.

EDWARD B. GRAVES.